US008712253B2

(12) United States Patent
Maeda et al.

(10) Patent No.: US 8,712,253 B2
(45) Date of Patent: Apr. 29, 2014

(54) OPTICAL PACKET SIGNAL TRANSMISSION DEVICE AND WDM OPTICAL COMMUNICATION NETWORK

(75) Inventors: Kouichi Maeda, Orojo (JP); Tomoyuki Sakata, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 201 days.

(21) Appl. No.: 13/468,494

(22) Filed: May 10, 2012

(65) Prior Publication Data

US 2012/0294612 A1 Nov. 22, 2012

(30) Foreign Application Priority Data

May 19, 2011 (JP) ................................. 2011-112054

(51) Int. Cl.
*H04B 10/00* (2013.01)
(52) U.S. Cl.
USPC ........................... 398/193; 398/182; 398/141
(58) Field of Classification Search
USPC .................................. 398/182–201, 140–141
See application file for complete search history.

(56) References Cited

U.S. PATENT DOCUMENTS

| | | | | |
|---|---|---|---|---|
| 5,912,998 | A * | 6/1999 | Quayle ............................ | 385/24 |
| 5,933,261 | A * | 8/1999 | Fukui et al. ..................... | 398/14 |
| 6,850,663 | B2 * | 2/2005 | Kikuchi et al. ................. | 385/24 |
| 7,260,327 | B1 * | 8/2007 | Shin et al. ....................... | 398/51 |
| 8,036,532 | B2 * | 10/2011 | Sakamoto et al. .............. | 398/67 |
| 8,107,824 | B2 * | 1/2012 | Tsuchiya et al. ............... | 398/168 |
| 2001/0017866 | A1 * | 8/2001 | Takada et al. .................. | 370/535 |
| 2002/0105691 | A1 * | 8/2002 | Ichibangase et al. .......... | 359/110 |
| 2007/0212065 | A1 * | 9/2007 | Shin et al. ........................ | 398/45 |
| 2012/0294612 | A1 * | 11/2012 | Maeda et al. ................... | 398/51 |

FOREIGN PATENT DOCUMENTS

JP 2002-261691 9/2002

OTHER PUBLICATIONS

H.Furukawa et al., "IP over Optical Packet Switch Network with Novel 10 Gigabit-Ethernet / 80 Git/s-Optical-Packet Converter" IEICE Technical Report vol. 107, No. 188, PN2007-13, pp. 21-26, Aug. 2007, Aug. 2, 2007.

* cited by examiner

*Primary Examiner* — Agustin Bello
(74) *Attorney, Agent, or Firm* — Staas & Halsey LLP (57) ABSTRACT

An optical packet signal transmission device includes a transmitting unit which includes a plurality of data delay circuits; a plurality of optical branch units which branches some of the optical packet signals as monitor lights; an optical switch which selects one of the monitor lights; a test signal generation circuit which generates a test signal which is used to adjust a delay amount in the data delay circuits; a reference optical pulse generation circuit which generates a reference optical pulse based on the test signal; an optical phase comparator which detects an relative optical phase difference by comparing the phases of the selected monitor light and the reference optical pulse; and a control circuit which sequentially sends the test signals to the data delay circuits, switches the selected monitor light, detects a relative optical phase, determines the delay amount based on a detection result, and sets the delay amount.

12 Claims, 8 Drawing Sheets

OPTICAL PACKET SIGNAL TRANSMISSION DEVICE AND WDM OPTICAL COMMUNICATION NETWORK

CROSS-REFERENCE TO RELATED APPLICATIONS

This application is based upon and claims the benefit of priority from the prior Japanese Patent Application No. 2011-112054 filed on May 19, 2011, the entire contents of which are incorporated herein by reference.

FIELD

The embodiments discussed herein are related to an optical packet signal transmission device, which is able to transmit optical packet signals by a Wavelength Division Multiplexing (WDM) method, and to a WDM optical communication network that is configured to have the optical packet signal transmission device.

BACKGROUND

Figure 1:
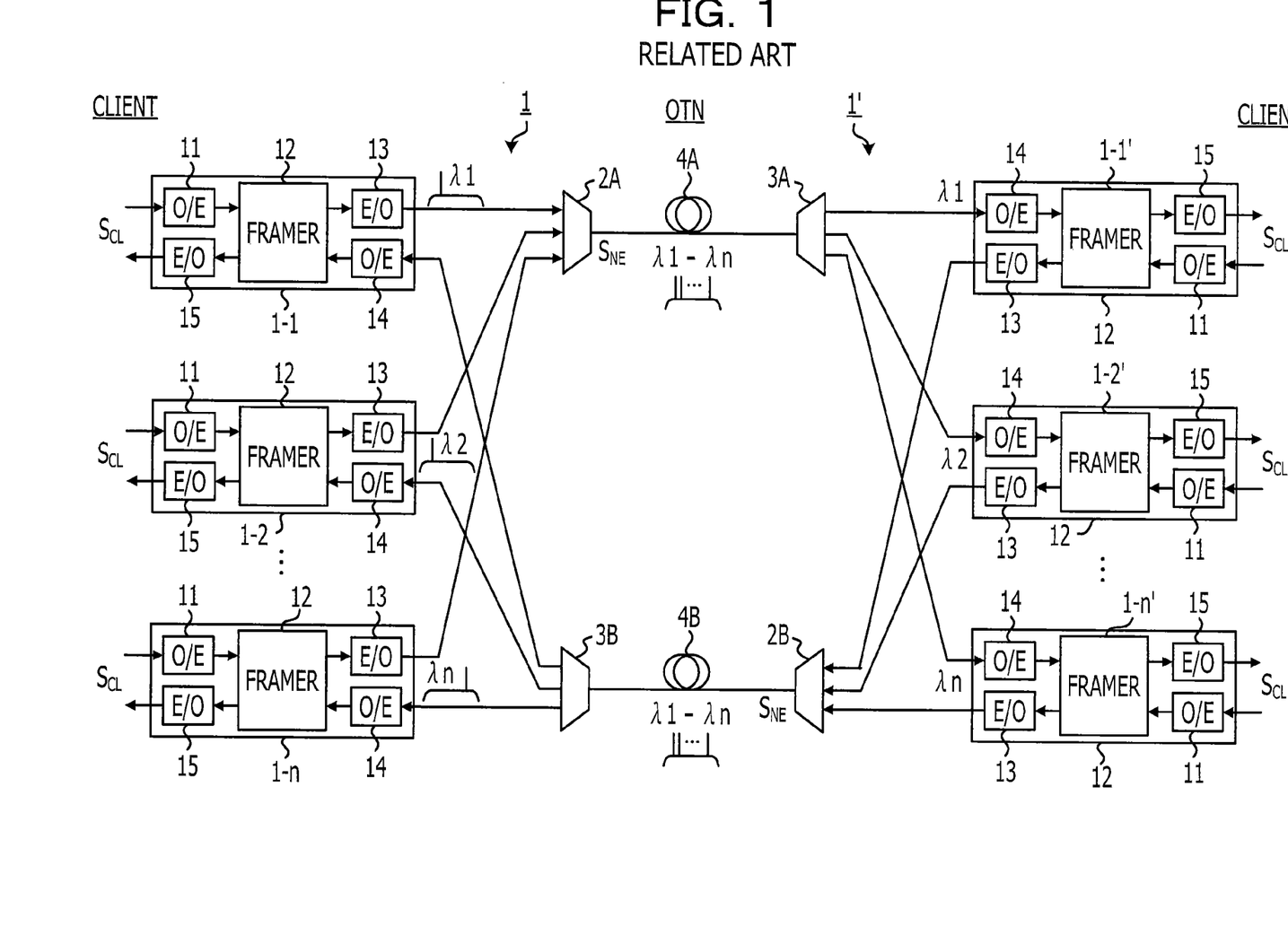
FIG. 1 is a diagram illustrating a configuration example of a WDM optical communication system.

FIG. 1 is a diagram illustrating a configuration example of a WDM optical communication system. The WDM optical communication network illustrated in FIG. 1 includes optical nodes 1 and 1' that are coupled with each other by a pair of WDM transmission paths 4A and 4B. A WDM light obtained by multiplexing a plurality of optical signals with various wavelengths is transmitted to and from the optical nodes 1 and 1'.

The optical node 1 includes, for example, a wavelength multiplexing device 2A, which multiplexes optical signals transmitted from a plurality of transponders 1-1, 1-2, etc., to 1-$n$ corresponding to various wavelengths $\lambda 1$ to $\lambda n$ and the optical signals transmitted from the transponders 1-1 to 1-$n$ and then outputs the multiplexed optical signals to the WDM transmission path 4A, and a wavelength separating device 3B, which separates the WDM light transmitted through the WDM transmission path 4B into optical signals with the wavelengths $\lambda 1$ to $\lambda n$ and sends the optical signals to the transponders 1-1 to 1-$n$ corresponding to the wavelengths, respectively. The optical node 1' includes a wavelength multiplexing device 2B, which multiplexes the optical signal transmitted from the plurality of transponders 1-1', 1-2', etc., 1-$n$' corresponding to the wavelengths $\lambda 1$ to $\lambda n$ and from the transponders 1-1' to 1-$n$' and outputs the optical signals to the WDM transmission path 4B, and a wavelength separating device 3A that separates the WDM lights transmitted through the WDM transmission path 4A into the optical signals with the wavelengths $\lambda 1$ to $\lambda n$ and sends the optical signals to the transponders 1-1' to 1-$n$' corresponding to the wavelengths, respectively.

In the optical node 1, an optical packet signal $S_{CL}$ transmitted from the client side is sent to each of the transponders 1-1 to 1-$n$. In each of the transponders 1-1 to 1-$n$, after the optical packet signal $S_{CL}$ transmitted from the client side is converted into an electric signal by a light reception unit (O/E) 11, the electric signal is subjected to mapping processing by a framer 12 corresponding to a frame configuration such as Optical Transport Network (OTN). After the electric signal processed by the framer 12 is converted into an optical signal with a narrow band wavelength by a light emission unit (E/O) 13, the electric signal is transmitted to the wavelength multiplexing device 2A. The wavelength multiplexing device 2A generates a WDM light $s_{NE}$ by multiplexing the optical signal with the wavelengths $\lambda 1$ to $\lambda n$ output from the E/O 13 of the transponders 1-1 to 1-$n$, and the WDM light $s_{NE}$ is transmitted to the optical node 1' through the WDM transmission path 4A on the network side.

In the optical node 1', the WDM light $s_{NE}$ transmitted through the WDM transmission path 4A is separated into the optical signals with the wavelengths $\lambda 1$ to $\lambda n$ by the wavelength separating device 3A. The separated optical signals are sent to the transponders 1-1' to 1-$n$' corresponding to the wavelengths, respectively. In the transponders 1-1' to 1-$n$', the optical signal from the wavelength separating device 3A is converted into an electric signal by a light reception unit (O/E) 14, and the electric signal is subjected to demapping processing by the framer 12. The electric signal that is subjected to the demapping processing by the framer 12 is converted into an optical packet signal $S_{CL}$ with a desired wavelength by a light emission unit (E/O) 15 and is then transmitted to the client side. Between the optical node 1 and the optical node 1', in the similar way in which the above-described transmission of the WDM light from the optical node 1 to the optical node 1' is performed through the WDM transmission path 4A, the WDM light transmission, which is in the reverse direction from the optical node 1' to the optical node 1, is performed through the WDM transmission path 4B.

In the WDM optical communication system as illustrated in FIG. 1, regardless of the existence of the optical packet signal $S_{CL}$ from the client side, the wavelength allocated to each of the transponders always occupies a channel of a WDM line on the network side. That is, corresponding to the optical packet signals $S_{CL}$ transmitted from the client side, a wavelength channel of the WDM light transmitted on the network side is set to be fixed. Thus, if the optical packet signal $S_{CL}$ from the client side is transmitted in a burst manner to each of the transponders, the transponder transmits the optical signal with a prescribed wavelength in a time in which the optical packet is received from the client side. Regarding the transmission of the WDM light on the network side, decrease of line efficiency is a problem.

Figure 2:
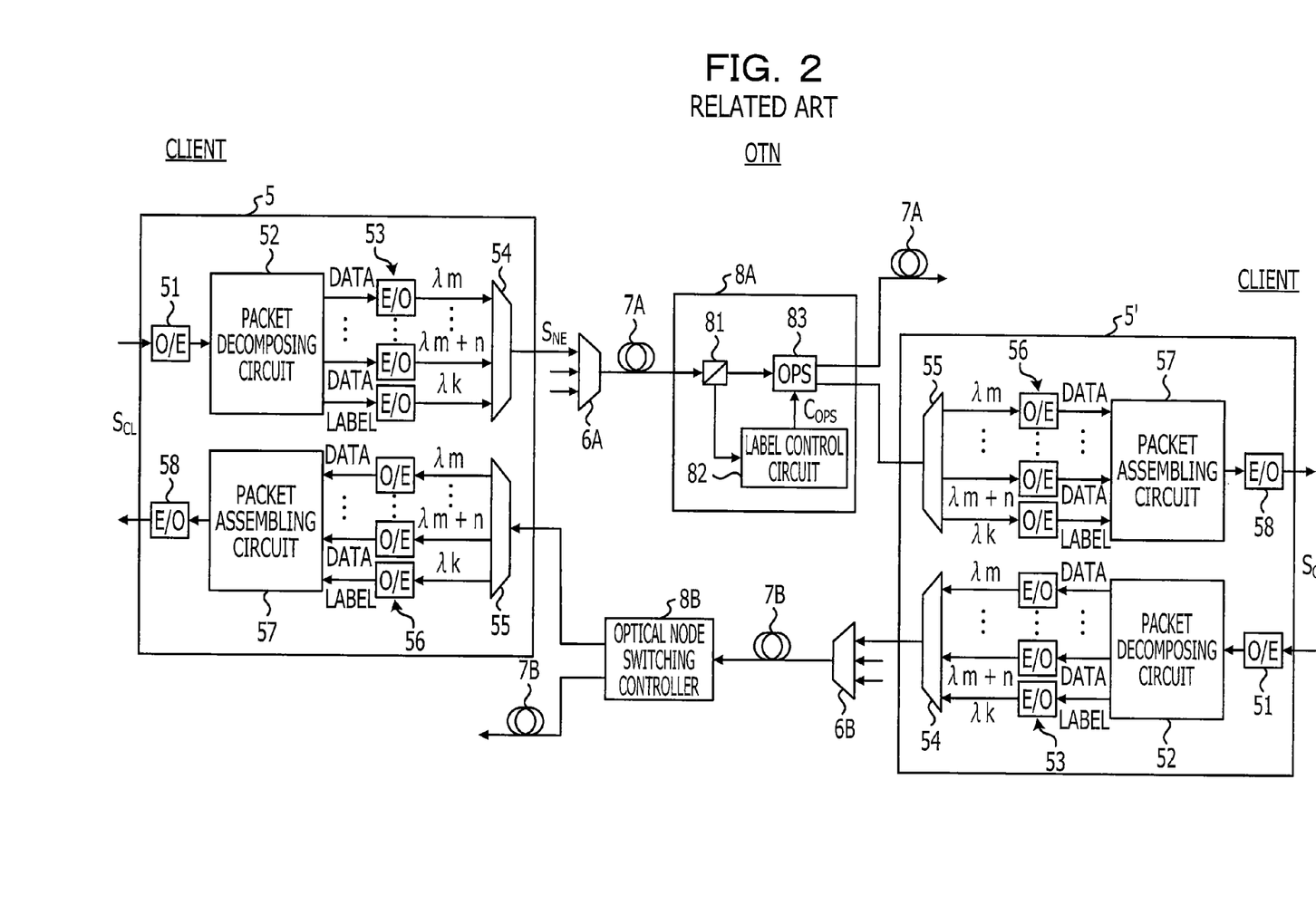
FIG. 2 is a diagram illustrating an example of a network configuration in which burst transmission of a WDM optical packet signal is performed.

As illustrated in FIG. 2, for example, as a related art, there is a network configuration in which burst transmission of the WDM optical packet signal is performed by using an Optical Packet Switch (OPS). As a Related art, for example, Japanese Laid-open Patent Publication No. 2002-261691, H. Furukawa et al., "IP over Optical Packet Switch Network with Novel 10 Gigabit-Ethernet/80 Git/s-Optical-Packet Converter" IEICE Technical Report Vol. 107, No. 108, PN2007-13, pp. 21-26, August 2007 is disclosed.

Specifically, according to the network configuration illustrated in FIG. 2, after the optical packet signal $S_{CL}$ transmitted to the transponder 5 from the client side is converted into an electric signal by a light reception unit (O/E) 51, the optical packet signal $S_{CL}$ is decomposed into a plurality of data signals by a packet decomposing circuit 52. The data signals decomposed by the packet decomposing circuit 52 are converted into light by an E/O 53 with the wavelengths $\lambda m$ to $\lambda m+n$ that are different from each other and are then sent to an optical packet multiplexing device 54. An optical label of the wavelength $\lambda k$, which is obtained by converting the label signal indicating destination information and node switch information into the light by the E/O 53 and is then output from the packet decomposing circuit 52, is sent to the optical packet multiplexing device 54. The optical packet signals with the wavelength $\lambda m$ to $\lambda m+n$ and the WDM optical packet signal $S_{NE}$ obtained by wavelength-multiplexed with the optical label of the wavelength $\lambda k$ are output from the optical packet multiplexing device 54. The WDM optical packet signal $S_{NE}$ is time-division multiplexed with the other transponder, of which the description is omitted by a time-division multiplexing device 6A, and is then transmitted to the WDM transmission path 7A on the network side.

Figure 3:
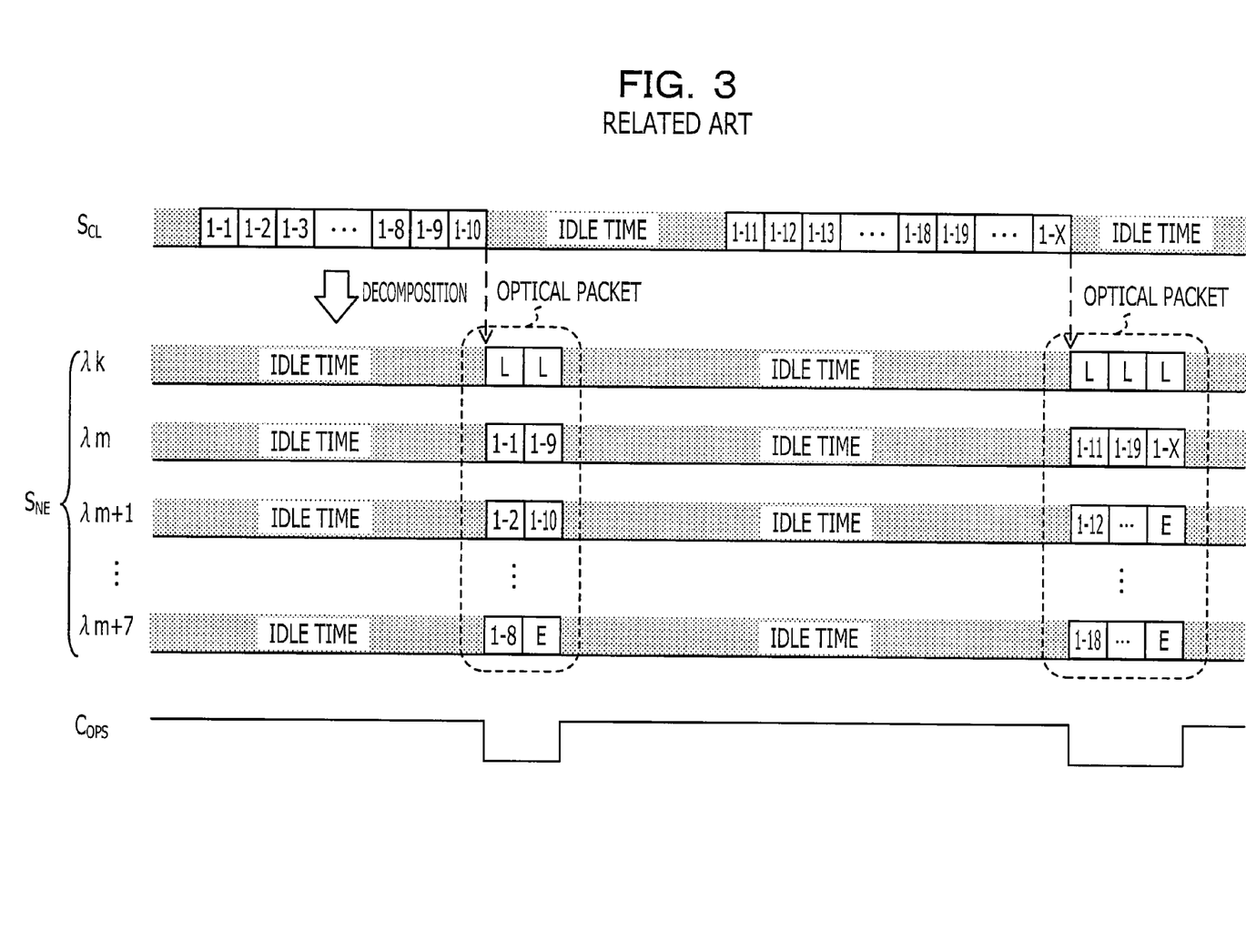
FIG. 3 is a diagram illustrating an example of an optical packet signal from a client side and of a correspondence relation between the optical packet signal with each wavelength and an optical label in the network configuration illustrated in FIG. 2.
Figure 4:
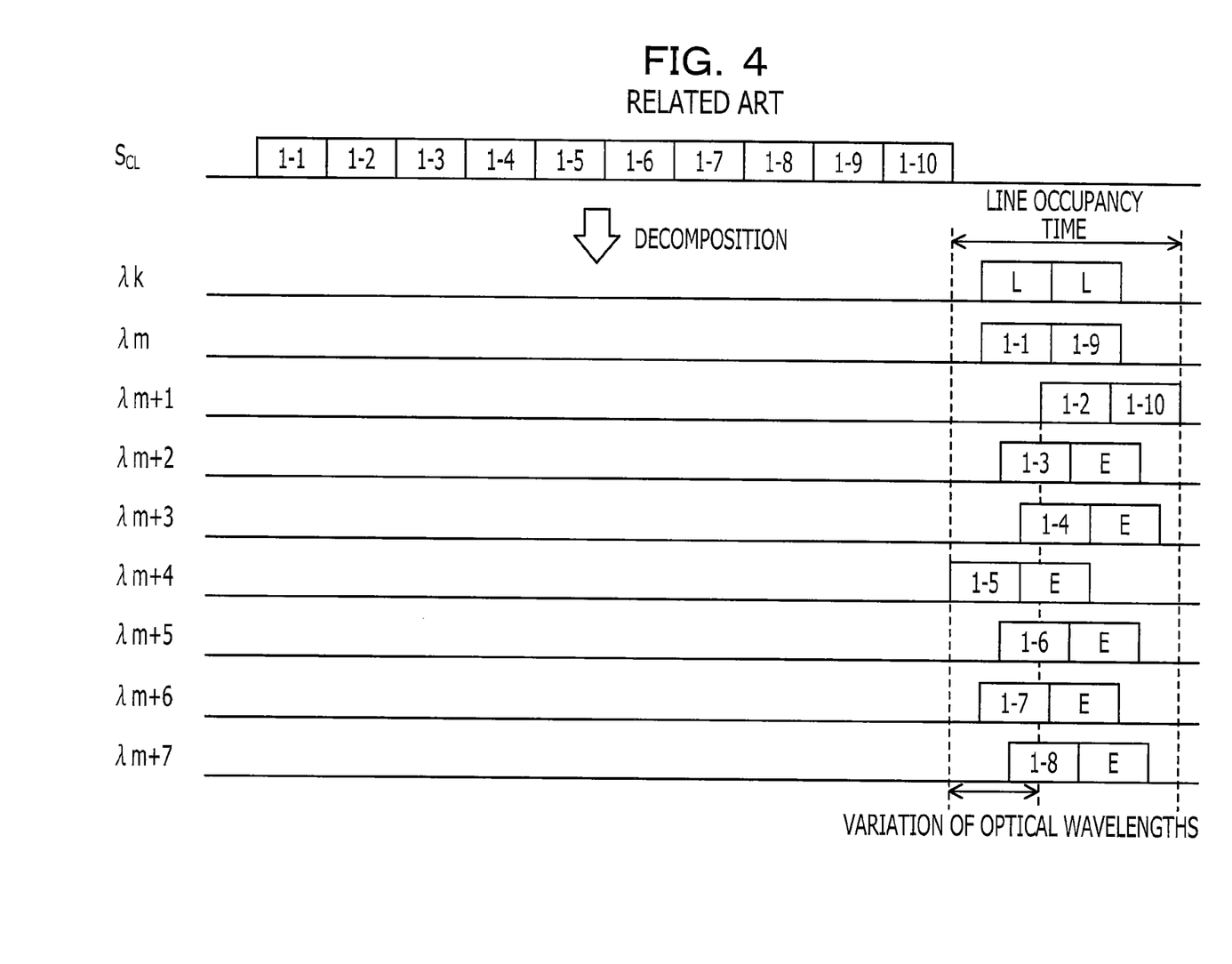
FIG. 4 is a diagram illustrating delay variations among wavelengths in the network configuration illustrated in FIG. 2.

FIG. 3 is a diagram illustrating an example of the optical packet signal $S_{CL}$ from the client side and of a correspondence relation between the optical packet signals with the wavelengths $\lambda m$ to $\lambda m+n$ and the optical label of the wavelength $\lambda k$. In the example illustrated in FIG. 3, the continuous data 1-1 to 1-10 and 1-11 to 1-X of the optical packet signal $S_{CL}$ from the client side corresponding to eight wavelengths, that is, the wavelengths $\lambda m$ to $\lambda m+7$, and are decomposed (parallelized). In FIG. 3, a numeral L indicates an area in which the label information is stored, and a numeral E indicates an empty data area.

The WDM optical packet signal $S_{NE}$ transmitted through the WDM transmission path 7A is sent to an optical node switching controller 8A allocated on the WDM transmission path 7A. In the optical node switching controller 8A, some of the WDM optical packet signals $S_{NE}$ are branched by an optical branch unit 81 and are then sent to a label control circuit 82. In the label control circuit 82, the optical label of the wavelength $\lambda k$ is extracted from the branched light branched by the optical branch unit 81. Based on the node switch information included in the label signal reproduced by optical-converting the optical label, the signal $C_{OPS}$ that controls the operation of an Optical Packet Switch (OPS) 83 coupled with a later stage of the optical branch unit 81 (see the signal waveform illustrated in the lowest stage in FIG. 3). Regarding the OPS 83, according to the control signal $C_{OPS}$ generated by the label control circuit 82, the WDM optical packet signal $S_{NE}$ that passes through the optical branch unit 81 is switched to be output to the transponder 5' side or to the WDM transmission path 7A side on the downstream.

In the transponder 5', after the WDM optical packet signals $S_{NE}$ output from the optical node switching controller 8A are separated by an optical packet separating device 55 into the optical packet signals with the wavelengths $\lambda m$ to $\lambda m+n$ and the optical labels with the wavelengths $\lambda m$ to $\lambda m+n$, and $\zeta k$, respectively, the signals are converted into electric signals by a light reception unit (O/E) 56 corresponding to the wavelengths $\lambda m$ to $\lambda m+n$, and $\lambda k$, respectively, and then converted into electric signals by the O/E 56 corresponding to the wavelengths $\lambda m$ to $\lambda m+n$, and $\lambda k$, respectively. The data signal output from the O/E 56 corresponding to the wavelengths $\lambda m$ to $\lambda m+n$ and the label signal output from the light receiver 56 corresponding to the wavelength $\lambda k$ are serialized by a packet assembling circuit 57 and are then converted into light by the E/O 58. After that, the optical packet signal $S_{CL}$ is transmitted to the client side.

Between the transponders 5 and 5', in the similar way in which the transmission of the optical packet signal from the transponder 5 to the transponder 5' through the WDM transmission path 7A and the optical node switching controller 8A is performed, the transmission of the optical packet signal in the reverse direction from the transponder 5' to the transponder 5 is performed through the WDM transmission path 7B and an optical node switching controller 8B.

In this manner, the optical packet signal is generated by decomposing a single client signal into a plurality of signals and allocating the signals to various wavelengths, and the WDM optical packet signal, which is obtained by adding the optical label to the optical packet signal, is generated and transmitted to the network side. Moreover, by controlling the optical switch on the WDM network according to the optical label to switch the code, the WDM optical packet signal may be efficiently burst-transmitted.

SUMMARY

According to an aspect of the invention, an optical packet signal transmission device includes a transmitting unit which sends a plurality of data signals, obtained by decomposing continuous data included in an optical packet signal received from a client side, to a plurality of light emission units with various wavelengths, converts the plurality of data signals into optical packet signals, and transmits WDM optical packet signals generated by wavelength-multiplexed with the converted optical packet signals with wavelengths to a network side, wherein the transmitting unit includes a plurality of data delay circuits which has variable delay amounts and separately delays the data signals sent to the light emission units; a plurality of optical branch units which branches some of the optical packet signals with the wavelengths, which are output from the light emission units, as monitor lights; an optical switch which selects one of the monitor lights with the wavelengths to be branched by the optical branch units; a test signal generation circuit which generates a test signal which is used to adjust the delay amount in the data delay circuits; a reference optical pulse generation circuit which generates a reference optical pulse based on a test signal generated by the test signal generation circuit; an optical phase comparator, into which the monitor light selected by the optical switch and the reference optical pulse generated by the reference optical pulse generation circuit, detects an relative optical phase difference by comparing the monitor light and the relative optical pulses; and a control circuit, before an operation of the optical packet signal transmission device starts, which sequentially sends the test signals, generated by the test signal generation circuit instead of the data signals, to the data delay circuits, switches the monitor light selected by the optical switch corresponding to the data delay circuit as an adjustment object to which the test signal is sends, detects the monitor light selected by the optical switch and a relative optical phase of the reference optical pulse, determines the delay amount in the optical phase difference is smaller than a maximum limit value determined in advance based on a detection result, and sets the delay amount after the operation starts in the data delay circuit as the adjustment object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 5:
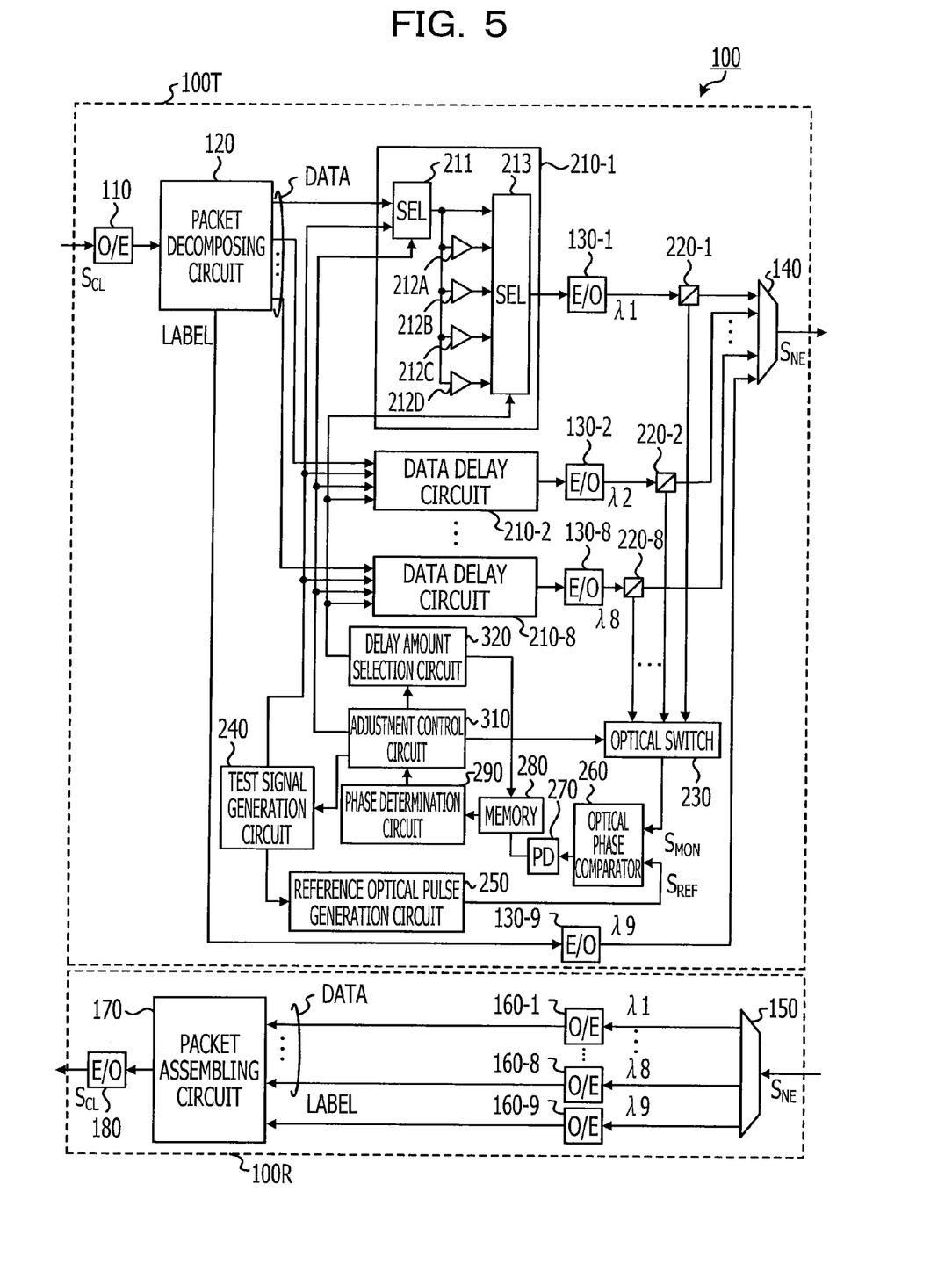
FIG. 5 is a block diagram illustrating an example of an optical packet signal transmission device according to the present embodiment.
Figure 6:
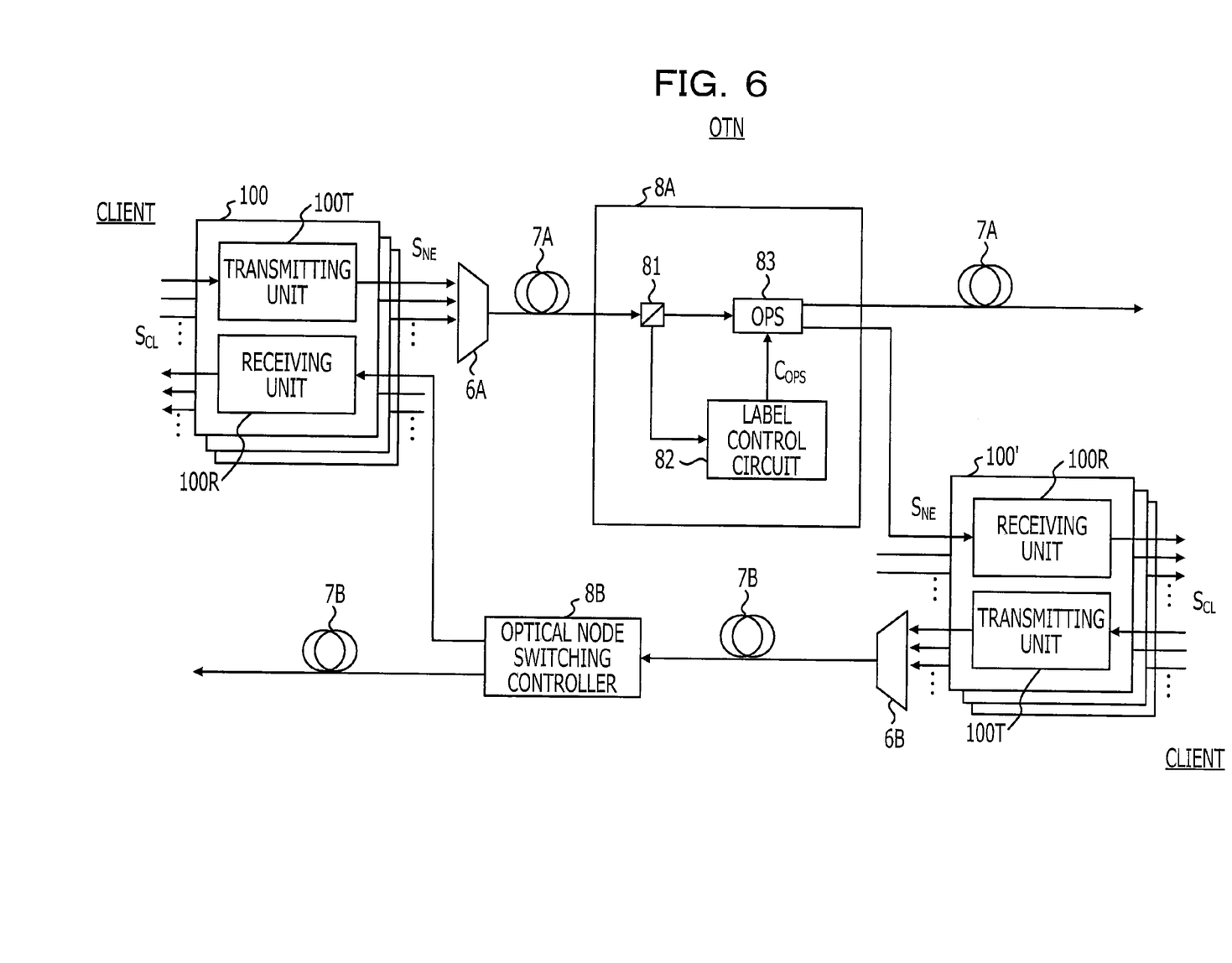
FIG. 6 is a block diagram illustrating a configuration example of a main part of a WDM optical communication network that is configured by using the optical signal transmission device illustrated in FIG. 5.

With reference to the attached diagrams, embodiments of the present invention will be described in detail. FIG. 5 is a block diagram illustrating an example of an optical packet signal transmission device according to an embodiment of the present invention. FIG. 6 is a block diagram illustrating a configuration example of a main part of the WDM optical communication network that is configured by using the optical signal transmission device illustrated in FIG. 5.

As described in FIG. 5, an optical signal transmission device 100 includes a transmitting unit 100T, which converts the optical packet signal $S_{CL}$ received from the client side into the WDM optical packet signal $S_{NE}$ to be transmitted to the network side, and a receiving unit 100R, which converts the WDM optical packet signal $S_{NE}$ received from the network side into the optical signal $S_{CL}$ to be transmitted to the client side.

The optical packet signal transmission device 100 corresponds to transponders 5 and 5' in a network configuration illustrated in FIG. 2. As illustrated in FIG. 3, optical packet signal transmission devices 100 and 100' are coupled with each other by using the time-division multiplexing devices 6A and 6B, WDM transmission paths 7A and 7B, and optical node switching controllers 8A and 8B. In this manner, the WDM optical communication network that may burst-transmit the WDM optical packet signals is configured.

Specifically, a transmitting unit 100T (FIG. 5) of the above-described optical packet signal transmission device 100 receives an optical packet signal $S_{CL}$, which is transmitted from the client side, by a light reception unit (O/E) 110. The O/E 110 converts the optical packet signal $S_{CL}$ transmitted from the client side into an electric signal and outputs the electric signal (hereinafter, referred to as "client signal") to a packet decomposing circuit 120.

Corresponding to the wavelengths λ1 to λ8, the packet decomposing circuit 120 decomposes (parallelize) continuous data included in the client signals output from the O/E 110. The data signals decomposed by the packet decomposing circuit 120 are transmitted to the data delay circuits 210-1 to 210-8 corresponding to the wavelengths λ1 to λ8, respectively. The packet decomposing circuit 120 generates the label signal illustrating destination information and node switch information related to the above-described data signals and outputs the label signals to the E/O 130-9 of the wavelength λ9 described below.

Each of the data delay circuits 210-1 to 210-8 includes a first selector (SEL) 211, delay buffers 212A to 212D, and a second selector (SEL) 213. Even though FIG. 5 illustrates simply the details of the data delay circuit 210-1, the configurations of the data delay circuits 210-2 to 210-8 are equivalent to the data delay circuit 210-1.

The first SEL 211 includes two input terminals and one output terminal. The data signal output from the packet decomposing circuit 120 is sent to one input terminal. The test signal output from the test signal generation circuit 240 described below is sent to the other input terminal. According to the output signal from an adjustment control circuit 310 described below, the first SEL 211 selects any of the data signals and the test signals transmitted to the input terminal and outputs the selected signal to the delay buffers 212A to 212D and the second SEL 213, respectively.

The delay buffers 212A to 212D with various delay amounts delay the output signal from the first SEL 211 according to the delay amounts, respectively, and outputs the output signal to the second SEL 213. Between the first SEL 211 and the second SEL 213, a path without delay buffer is provided as well as four paths that include the delay buffers 212A to 212D allocated in parallel.

The output signal (without delay buffer) from the first SEL 211 and the output signals from the delay buffers 212A to 212D are input into the second SEL 213. According to the signal output from the delay amount selection circuit 320 described below, the second SEL 213 selects and outputs one of the above-described input signals. The signals output from the second SEL 213 of the data delay circuits 210-1 to 210-8 are transmitted to light emission units (E/Os) 130-1 to 130-8 coupled with the output terminals of the data delay circuits 210-1 to 210-8.

The E/Os 130-1 to 130-8 have narrow band wavelengths λ1 to λ8, respectively, and convert the output signals from the data delay circuits 210-1 to 210-8 into optical packet signals. The optical packet signals with the wavelengths λ1 to λ8 converted by the E/Os 130-1 to 130-9 are sent to an optical multiplexing device 140 through optical branch units 220-1 to 220-8 corresponding to the wavelengths. The E/O 130-9, which receives the label signal from the packet decomposing circuit 120, includes the narrow band wavelength λ9 that is different from the above-described wavelengths λ1 to λ8. The E/O 130-9 converts the label signal into the light label of the wavelength λ9 and outputs the optical label to the optical packet multiplexing device 140.

By wavelength-multiplexing the optical packet signals with the wavelengths λ1 to λ8 and the optical label of the wavelength λ9, the optical packet multiplexing device 140 generates the WDM optical packet signal $S_{NE}$ that includes the optical label and then transmits the WDM optical packet signal $S_{NE}$ to the time-division multiplexing device 6A (FIG. 6).

The optical branch units 220-1 to 220-8 branch some of the optical signals to be transmitted from the E/Os 130-1 to 130-8 to the optical packet multiplexing device 140, respectively, and then transmit the monitor light $S_{MON}$ to an optical switch 230.

According to the control signal output from the adjustment control circuit 310, the optical switch 230 selects one of the monitor lights $S_{MON}$ branched by the optical branch units 220-1 to 220-8 and then outputs the selected monitor light $S_{MON}$ to an optical phase comparator 260. As well as the monitor light $S_{MON}$ selected by the optical switch 230, the optical phase comparator 260 receives a reference optical pulse $S_{REF}$ generated by a reference optical pulse generation circuit 250 by using a test signal output from a test signal generation circuit 240.

The test signal generation circuit 240 operates according to the output signal from the adjustment control circuit 310 and generates the test signals to be used to adjust the delay amount according to the wavelength λ1 to λ8, respectively. The test signal has a bit rate that is equal to the data signal that is decomposed by the packet decomposing circuit 120, and the bit value varies according to a test pattern determined in advance. The test signals generated by the test signal generation circuit 240 are output to the first SEL 211 and the reference optical pulse generation circuit 250 inside the data delay circuits 210-1 to 210-8, respectively.

The reference optical pulse generation circuit 250 delays the test signal, which is to be output from the test signal generation circuit 240, simply by an estimated delay amount that is set in advance in consideration of the circuit configuration inside the transmitting unit 100T. The reference optical pulse generation circuit 250 generates the reference optical pulse $S_{REF}$ by converting the delayed test signal into light, and sends the reference optical pulse $S_{REF}$ to the optical phase comparator 260.

The monitor light $S_{MON}$ selected by the optical switch 230 and the reference optical pulse $S_{REF}$ generated by the reference optical pulse generation circuit 250 are input into the optical phase comparator 260. The optical phase comparator 260 detects a comparative optical phase difference based on the comparison of the phases of the input lights and outputs the light of which the level varies according to the optical phase difference. The optical phase comparator 260 may be achieved by using an optical modulator using a substrate with an electric optical effect such as lithium niobate ($LiNbO_3$: LN), for example. However, the optical phase comparator 260 is not limited to the above-described embodiments. A known optical device that may compare optical phases is applicable.

An optical detector (PD) 270 detects the power of the light output from the optical phase comparator 260 and outputs the electric signal of which the current or the voltage level varies according to the power. The output of the PD 270 is coupled with a memory 280. The memory 280 records a level change of the electric signal, which is output from the PD 270, with information related to the setting of the delay amount at the time.

Based on the information recorded in the memory 280, a phase determination circuit 290 determines the delay amount in which the optical phase difference between the monitor light $S_{MON}$ and the reference optical pulse $S_{REF}$ is smaller than the maximum limit determined in advance and outputs the signal indicating the determination result to the adjustment control circuit 310.

According to the control sequence of the delay amount described below, the adjustment control circuit 310 controls the operation of each of the optical switch 230, the test signal generation circuit 240, the first SEL 211 and the delay amount selection circuit 320 inside the data delay circuits 210-1 to 210-8.

According to the delay amount instructed by the adjustment control circuit 310, the delay amount selection circuit 320 switches the path selected by the second SEL 213 inside the data delay circuits 210-1 to 210-8. The information related to the delay amount selected by the delay amount selection circuit 320 is sent to the memory 280 and is then referred to record the detection result of the PD 270 in the memory 280.

A receiving unit 100R illustrated in the lower side of FIG. 5 receives the WDM optical packet signal $S_{NE}$ transmitted from the optical node switching controllers 8A and 8B (FIG. 6) allocated on the WDM transmission paths 7A and 7B on the network side. The receiving unit 100R transmits the received WDM optical packet signal $S_{NE}$ to an optical packet separating device 150. The optical packet separating device 150 separates the received WDM optical packet signals $S_{NE}$ into the optical packet signals with the wavelengths $\lambda 1$ to $\lambda 8$ and the optical label with the wavelength $\lambda 9$ and outputs the signals to the corresponding light reception units (O/Es) 160-1 to 160-9, respectively.

The O/Es 160-1 to 160-8 convert the optical packet signals of the wavelengths $\lambda 1$ to $\lambda 8$ separated by the optical packet separating device 150 into the electric data signals, respectively, and then outputs the data signals to a packet assembling circuit 170. The O/E 160-9 converts the optical label of the wavelength $\lambda 9$ separated by the optical packet separating device 150 into a label signal and then outputs the label signal to the packet assembling circuit 170.

The packet assembling circuit 170 reproduces the client signal by serializing the data signal output from the O/Es 160-1 to 160-8 and the label signal output from the E/O 160-9 and outputs the client signal to a light emission unit (E/O) 180. By converting the client signal output from the packet assembling circuit 170 into light, the E/O 180 generates an optical packet signal $S_{CL}$ to be transmitted to the client side.

Regarding the operation of the above-described optical packet signal transmission device 100, the control operation of the delay amount according to the wavelengths in the transmitting unit 100T will be mainly described. In the transmitting unit 100T, to prevent the delay variation among the wavelengths $\lambda 1$ to $\lambda 8$ of the WDM optical packet signal $S_{NE}$ to be transmitted to the network side, the delay amounts are sequentially controlled by using the test signal with respect to the wavelengths $\lambda 1$ to $\lambda 8$ before the operation starts.

Figure 7:
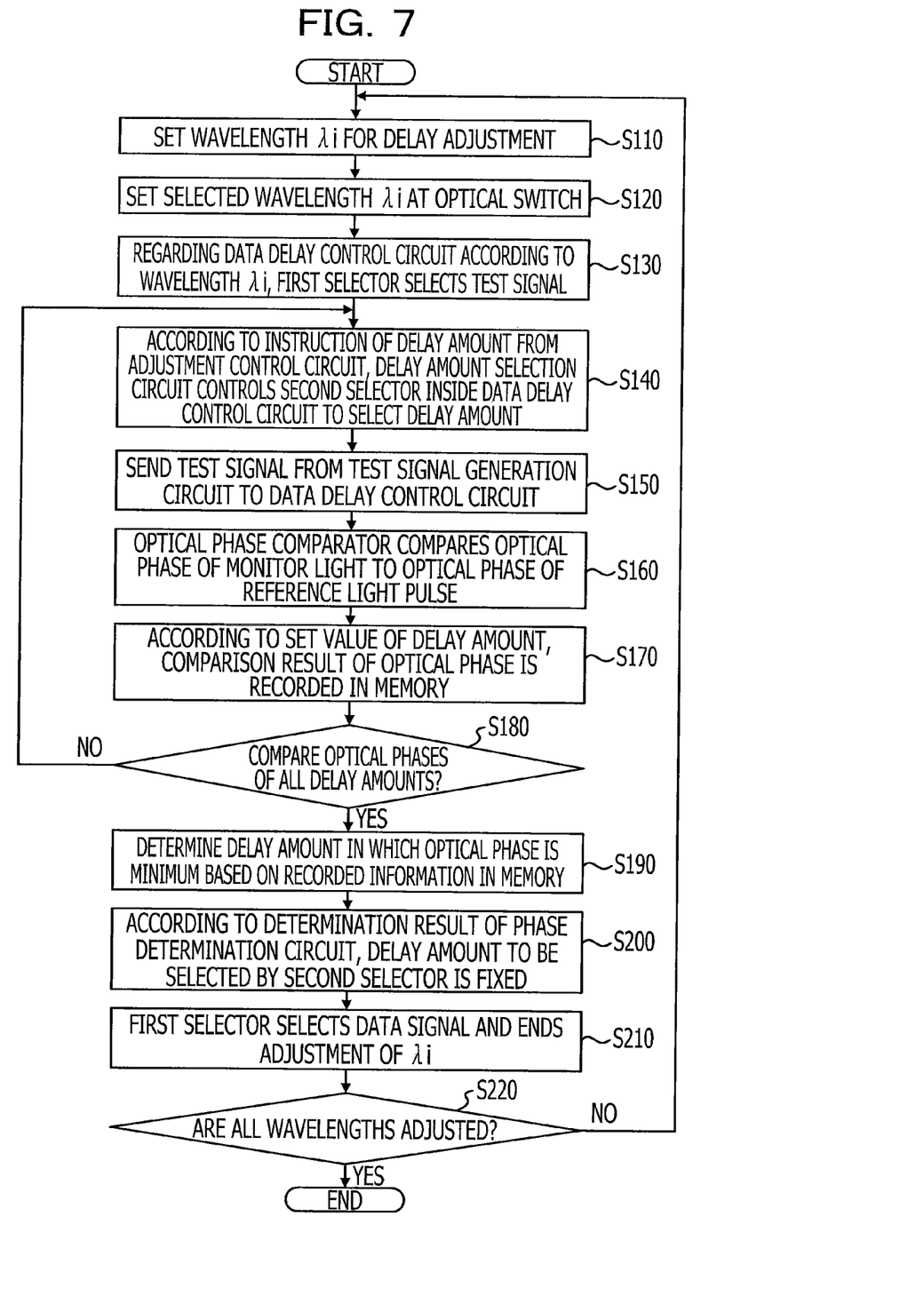
FIG. 7 is a flowchart illustrating an example of a control procedure of a delay amount in a transmitting unit.

FIG. 7 is a flowchart illustrating an example of a control procedure of the delay amount. In Operation 110 illustrated in FIG. 7, the adjustment control circuit 310 sets any of the wavelengths $\lambda 1$ to $\lambda 8$ as an adjustment target of the delay amount. In this case, the wavelength as $\lambda i$ (in this case, i=1 to 8) that is set as the adjustment target of the delay amount is described.

In Operation 120, according to the set wavelength $\lambda i$, the adjustment control circuit 310 controls the optical switch 230 so that the monitor light $S_{MON}$ corresponding to the wavelength $\lambda i$ is output from the optical switch 230. In Operation 130, the adjustment control circuit 310 controls the first SEL 211 inside the data delay circuit 210-$i$ corresponding to the wavelength $\lambda i$ so that the test signal is selected and output by the first SEL 211.

In Operation 140, the signal instructing the delay amount in the data delay circuit 210-$i$ is sent to the delay amount selection circuit 320 from the adjustment control circuit 310. According to the instruction of the delay amount, the delay amount selection circuit 320 controls the second SEL 213 inside the data delay circuit 210-$i$ so that the path corresponding to the instructed delay amount is selected. The delay amount in the data delay circuit 210-$i$ varies depending on the delay buffer from among the delay buffers 212A to 212D on the path selected by the second SEL 213. For example, the path without delay buffer (delay amount=0) is selected at the beginning of the adjustment. After that, the paths on which the delay buffers 212A to 212D are allocated are sequentially selected.

After the setting of the second SEL 213 inside the data delay circuit 210-$i$ is completed, the signal for operating the test signal generation circuit 240 is output to the test signal generation circuit 240 from the adjustment control circuit 310 in Operation 150. Therefore, the test signals generated by the test signal generation circuit 240 are transmitted to the data delay circuits 210-1 to 210-8 and the reference optical pulse generation circuit 250, respectively.

After passing through the first SEL 211, the test signals sent to the data delay circuit 210-$i$ are transmitted to the second SEL 213 through the paths without the delay buffer and the paths on which the delay buffers 212A to 212D are allocated. One of the test signals passing through the paths is selected and transmitted to the E/O 130-$i$ from the second SEL 213. If the test signal from the data delay circuit 210-$i$ is converted into a test signal, the E/O 130-$i$ generates the optical packet signal with the wavelength $\lambda i$. Some of the optical packet signals with the wavelength $\lambda i$ are branched as the monitor light $S_{MON}$ by an optical branch unit 220-$i$, and the monitor light $S_{MON}$ is sent to the optical phase comparator 260 through the optical switch 230. The test signal transmitted to the reference optical pulse generation circuit 250 is sent to the optical phase comparator 260 by being converted into the light as the reference optical pulse $S_{REF}$ after being delayed simply by the estimated delay amount.

In Operation 160, the optical phase comparator 260 performs phase comparing of the monitor light $S_{MON}$ and the reference optical pulse $S_{REF}$. The light of which the level varies according to the optical phase difference is output from the optical phase comparator 260 to the PD 270. In Operation 170, the PD 270 detects the power of the output light from the optical phase comparator 260 and records, in the memory 280, the detection result with the setting of the delay amount at the time.

After the detection result of the PD 270 is recorded in the memory 280, in Operation 180, determination is performed to indicate whether or not the optical phases are compared with respect to all the delay amounts that may be set to the data delay circuit 210-i. If there is the left delay amount in which the comparison of the optical phases is not performed, the process goes back to Operation 140. The second SEL 213 inside the data delay circuit 210-i is switched so that another delay amount is selected, and the processing of the above-described Operations 150 to 180 is repeated.

When the optical phase comparison with respect to all the delay amounts that may be set to the data delay circuit 210-i is completed, the process goes to Operation S190. Based on the recorded formation in the memory 280, the phase determination circuit 290 determines the delay amount in which the optical phase difference between the monitor light $S_{MON}$ and the reference optical pulse $S_{REF}$ is smaller than the maximum limit determined in advance.

The determining processing of the delay amount in the above-described phase determination circuit 290 will be described in detail with reference to the specific example illustrated in FIG. 8. FIG. 8A illustrates an example of a bit pattern and a signal waveform of the test signal output from the test signal generation circuit 240. FIG. 8B illustrates a bit pattern and an optical waveform of the reference optical pulse $S_{REF}$ generated by the reference optical pulse generation circuit 250 by using the above-described test signal. The optical phase of the reference optical pulse $S_{REF}$ is delayed simply by the estimated delay amount with respect to the phase of the test signal.

When the data delay circuit 210-i selects a path without delay buffer is selected, the E/O 130-i converts the test signal output from the data delay circuit 210-i into light. Some of the monitor light $S_{MON}$ are extracted by the optical branch unit 220-i and formed in a bit pattern and an optical waveform as illustrated in FIG. 8C. The delay of the optical phase of the monitor light $S_{MON}$ from the phase of the test signal is caused by the time desired for electric/optical conversion in the E/O 130-i and by the delay in the feedback path that includes the optical branch unit 220-i and the optical switch 230.

Figure 8:
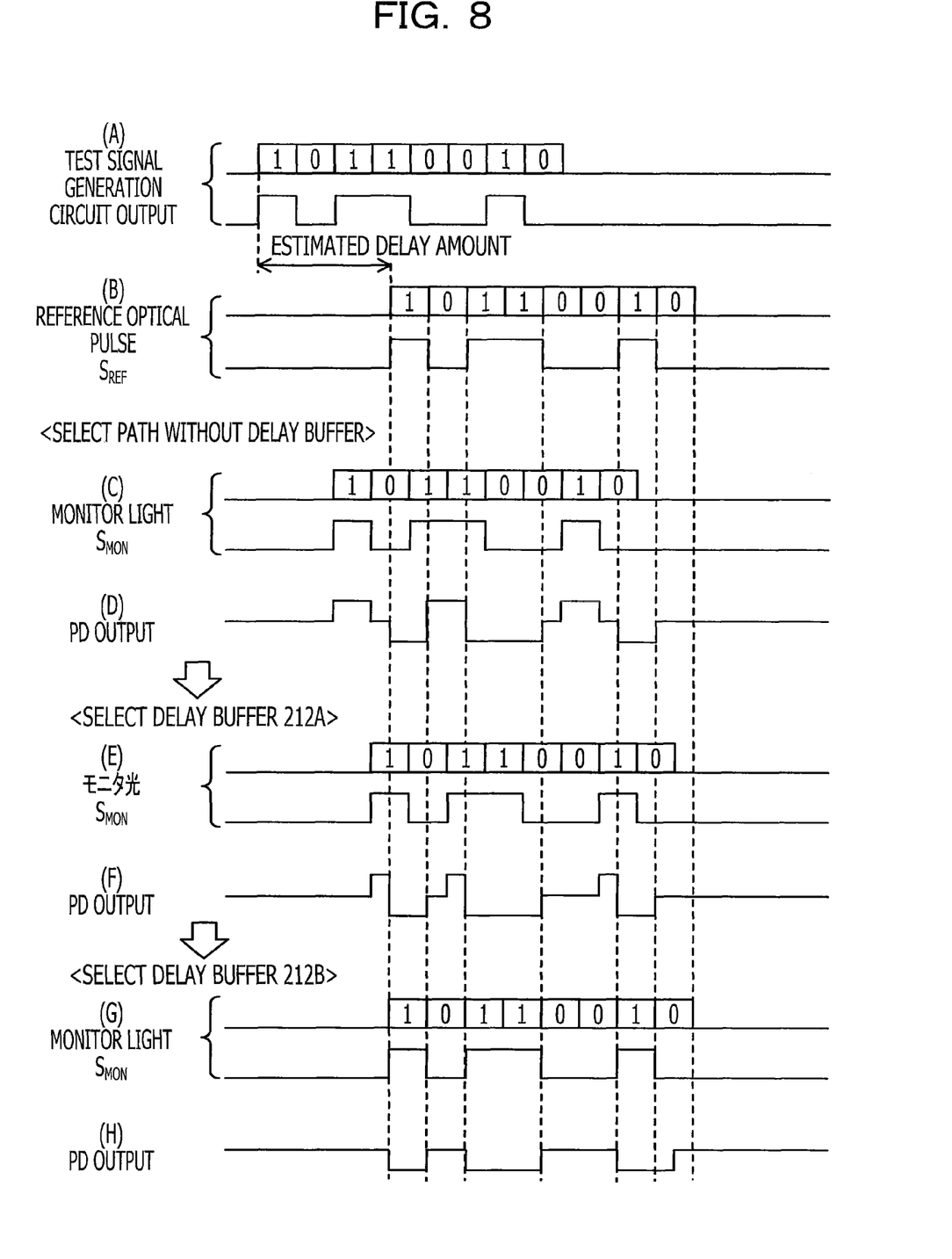
FIG. 8 is a diagram illustrating determining processing of the delay amount in a phase determination circuit.

The optical phase comparator 260 compares the optical phase of the reference optical pulse $S_{REF}$ illustrated in FIG. 8B to the optical phase of the monitor light $S_{MON}$ illustrated in FIG. 8C. If the optical detector 270 detects the power of the output light of the optical phase comparator 260, the PD 270 outputs the electric signal indicating the level change as illustrated in FIG. 8D. In this case, according to the characteristic of the optical phase comparator 260, if the reference optical pulse $S_{REF}$ has "0" level and if the monitor light $S_{MON}$ has "0" level, the output optical power of the optical phase comparator 260 has "Middle Level," if the reference optical pulse $S_{REF}$ has "1" level and if the output optical power of the optical phase comparator 260 has "0" level, the output optical power of the optical phase comparator 260 has "Low Level," if the reference optical pulse $S_{REF}$ has "0" level and if the monitor light $S_{MON}$ has "1" level, the output optical power of the optical phase comparator 260 has "High Level," and if the reference optical pulse $S_{REF}$ has "1" level and if the monitor light $S_{MON}$ has "1" level, the output optical power of the optical phase comparator 260 has "Low Level." The characteristic of the optical phase comparator 260 is not limited to the above-described example. The characteristic of the optical phase comparator 260 depends on the types of the optical phase comparer to be applied.

The second SEL 213 of the data delay circuit 210-i is switched, and the monitor light $S_{MON}$ in a case where the path with the delay buffer 212A is selected is formed in a bit pattern and an optical waveform as illustrated in FIG. 8E. The output signal of the PD 270 obtained by comparing, by the optical phase comparator 260, the optical phase of the monitor light $S_{MON}$ to the optical phase of the reference light pulse $S_{REF}$ illustrated in FIG. 8B indicates the level change as illustrated in FIG. 8F. In the similar manner of the above-described case without the delay buffer, the output signal of the PD 270 varies among the low level, the middle level, and the high level.

The second SEL 213 inside the data delay circuit 210-i is switched, and the monitor light $S_{MON}$ in a case where the path with the delay buffer 212B of which the delay amount is larger than the delay amount of the delay buffer 212A is selected is formed in a bit pattern and an optical waveform as illustrated in FIG. 8G. The optical phase of the monitor light $S_{MON}$ matches the optical phase of the reference optical pulse $S_{REF}$ illustrated in FIG. 8B. The output signal of the PD 270, which is obtained by comparing the optical phase of the monitor light $S_{MON}$ to the optical phase of the reference light pulse $S_{REF}$, indicates the level change as illustrated in FIG. 8H. Unlike the above-described case of the delay buffer 212A, the output signal of the PD 270 varies between the low level and the middle level and does not have the high level. That is, if the delay amount in which the optical phase of the monitor light $S_{MON}$ matches the optical phase of the reference optical pulse $S_{REF}$ is selected, the output level of the PD 270 has the lowest level.

If the paths (not illustrated in FIG. 8) with the delay buffers 212C and 212D, which have a larger delay amount than the delay amount of the delay buffer 212B are selected, the optical phase of the monitor light $S_{MON}$ is delayed from the optical phase of the reference optical pulse $S_{REF}$. Therefore, the output signal of the PD 270 varies among the low level, the middle level, and the high level.

Accordingly, in Operation 190 described above, when the phase determination circuit 290 refers to the recorded information in the memory 280 and if there is data in which the output signal of the PD 270 does not have the high level, the optimal phase state may be obtained by selecting the delay amount at the time. If there is no data in which the output signal of the PD 270 does not have the high level, the data of which the time in which the output signal of the PD 270 has the high level is shortest is specified, and the delay amount at the time may be determined to be optimal. That is, if the permission range of the delay variation is determined in advance, a threshold value of the time at which the output signal of the PD 270 has the high level according to an allowable range. Regarding the recorded information in the memory 280, the optical detector 270 extracts the data where the time in which the output signal of the PD 270 has the high level is shorter than the threshold value. This makes it possible to select the delay amount in which the delay variation is reduced within the allowable range. At this time, if a plurality of data is extracted, it is preferable that the delay amount corresponding to the data where the time, in which the output signal of the PD 270 has the high level is shortest, is selected.

When the determining processing of the delay amount of the phase determination circuit 290 is completed in the above-described manner, the determination result of the phase determination circuit 290 is sent to the adjustment control circuit 310 in Operation 200 illustrated in FIG. 7. The adjustment control circuit 310 sends an instruction on the determined delay amount to the delay amount selection circuit 320. As a result, the path (delay buffer) selected by the second SEL 213 inside the data delay circuit 210-$i$ is fixed.

In Operation 210, the adjustment control circuit 310 controls the first SEL 211 inside the data delay circuit 210-$i$ and ends the adjustment of the delay amount for the wavelength $\lambda i$ so that the data signal output from the packet decomposing circuit 120 is selected by the first SEL 211.

In Operation 202, the delay amount is determined to be adjusted or not with respect to all the wavelengths $\lambda 1$ to $\lambda 8$. If the delay amount is not adjusted for any of the wavelengths, the process goes back to Operation 110. The above-described sequence processing is repeated. As a result, the delay amount in the data delay circuits 210-1 to 210-8 corresponding to the wavelengths $\lambda 1$ to $\lambda 8$ are optimized based on the reference optical pulse $S_{REF}$.

The above-described transmitting unit 100T performs the control of the delay amount corresponding to the wavelengths $\lambda 1$ to $\lambda 8$ before the operation starts. Due to this, even if there is time variation desired for electric/optical conversion in the E/Os 130-1 to 130-8 of the wavelengths $\lambda 1$ to $\lambda 8$, the time variation may be reduced by the delay amounts that are separately set to each of the data delay circuits 210-1 to 210-8. This makes it possible to shorten the time in which the WDM optical packet signal $S_{NE}$, which is generated by wavelength-multiplexing the optical packet signals with the wavelengths $\lambda 1$ to $\lambda 8$ by the optical packet multiplexing device 140, occupies the line on the network side.

Procedures after the start of the operation of the optical packet signal transmission device 100 will be described. In this case, in the network configuration illustrated in FIG. 6, the transmitting unit 100T of the optical packet signal transmission device 100 on the left side transmits the WDM optical packet signal $S_{NE}$, and the receiving unit 100R of the optical packet signal transmission device 100' on the right side through the time-division multiplexing device 6A, the WDM transmission path 7A, and the optical node switching controller 8A.

When the operation of the optical packet signal transmission device 100 is started and when the optical packet signal $S_{CL}$ from the client side is sent to the transmitting unit 100T (FIG. 5), the packet signal $S_{CL}$ is converted into an electric signal by the light receiver 110 and is then decomposed into eight data signals corresponding to the wavelength $\lambda 1$ to $\lambda 8$ by the packet decomposing circuit 120. The data signals decomposed by the packet decomposing circuit 120 are sent to the data delay circuits 210-1 to 210-8, respectively, in which the delay amounts are optimized before the operation starts. The data signals passing through the data delay circuits 210-1 to 210-8 are converted into the light by the E/Os 130-1 to 130-8 of the wavelengths $\lambda 1$ to $\lambda 8$, and the optical packet signals with the wavelengths $\lambda 1$ to $\lambda 8$ are sent to the optical packet multiplexing device 140.

The optical packet multiplexing device 140 receives the optical label of the wavelength $\lambda 9$ obtained by converting the label signal output from the packet decomposing circuit 120 into the light by the E/O 130-9. If the optical packet signal with the wavelengths $\lambda 1$ to $\lambda 8$ are multiplexed with the optical label of the wavelength $\lambda 9$, the WDM optical packet signal $S_{NE}$ with the optical label is generated. The WDM optical packet signal $S_{NE}$ is sent to the time-division multiplexing device 6A (FIG. 6) coupled with the network side of the transmitting unit 100T and is time-division multiplexed with the WDM optical packet signal output from the transmitting unit of the optical packet signal transmission device and is then transmitted to the WDM transmission path 7A on the network side.

The WDM optical packet signal $S_{NE}$ transmitted through the WDM transmission path 7A is sent to the optical node switching controller 8A (FIG. 6) allocated on the WDM transmission path 7A, and some of the WDM optical packet signals branched by the optical branch unit 81 are sent to the label control circuit 82. In the label control circuit 82, the optical label of the wavelength $\lambda 9$ is extracted from the branched light from the optical branch unit 81, and a signal $C_{OPS}$ that controls the operation of the OPS 83 coupled with a later stage of the optical branch unit 81 is generated based on the node switch information included in the label signal obtained by optical/electrical-converting the optical label to be reproduced. According to the control signal $C_{OPS}$ from the label control circuit 82, the OPS 83 performs switching for outputting the WDM optical packet signal $S_{NE}$ passing through the optical branch unit 81 to the receiving unit 100R of the optical signal transmission device 100' or to the WDM transmission path 7A on the downstream.

In the receiving unit 100R of the optical packet signal transmission device 100', after the WDM optical packet signals output from the optical node switching controller 8A are separated by the optical packet separating device 150 into the optical packet signals with the wavelengths $\lambda 1$ to $\lambda 8$ and the optical labels with the wavelength $\lambda 9$, the signals are converted into electric signals by the O/Es 160-1 to 160-9 with the wavelengths $\lambda 1$ to $\lambda 9$. The data signal output from each of the O/Es 160-1 to 160-8 corresponding to the wavelengths $\lambda 1$ to $\lambda 8$ and the label signal output from the O/E 160-9 corresponding to the wavelength $\lambda 9$ are serialized and are then converted into light by the E/O 180, and the optical packet signal $S_{CL}$ is transmitted to the client side.

According to the optical packet signal transmission device 100 and 100' described in the embodiments, the WDM optical packet signal $S_{NE}$ of which the line occupancy time is shortened may be transmitted to the network side compared to the conventional case. As a result, the decrease of the line efficiency may be reduced even though the packet density of the transmission light is high, so that the WDM optical packet signal $S_{NE}$ is burst-transmitted efficiently.

The above-described embodiments have illustrated the example in which the continuous data of the optical packet signal from the client side is decomposed (parallelized) into eight data corresponding to the wavelengths $\lambda 1$ to $\lambda 8$ by the packet decomposing circuit 120. The number of the data signals to be decomposed by the packet decomposing circuit 120, in other words, the number of the optical wavelengths corresponding to the data included in the WDM optical packet to be transmitted to the network side is not limited to the above-described example and may be set to an arbitrary number.

Regarding the data delay circuits 210-1 to 210-8, the configuration example in which five types of delay amount, that is, the delay amount without delay buffer, the delay buffers 212A to 212D has been described. The types of the delay amounts that may be set to the data delay circuits 210-1 to 210-8 may be determined according to the degree of the delay variation and the allowable accuracy. That is, when many delay buffers with various delay amounts are allocated in parallel, the delay variation in a wide range may be reduced or the delay variation may be prevented with a higher accuracy.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An optical packet signal transmission device, comprising:
   a transmitting unit which sends a plurality of data signals, obtained by decomposing continuous data included in an optical packet signal received from a client side, to a plurality of light emission units with various wavelengths, converts the plurality of data signals into optical packet signals, and transmits WDM optical packet signals generated by wavelength-multiplexed with the converted optical packet signals with wavelengths to a network side, wherein the transmitting unit includes:
   a plurality of data delay circuits which has variable delay amounts and separately delays the data signals sent to the light emission units;
   a plurality of optical branch units which branches some of the optical packet signals with the wavelengths, which are output from the light emission units, as monitor lights;
   an optical switch which selects one of the monitor lights with the wavelengths to be branched by the optical branch units;
   a test signal generation circuit which generates a test signal which is used to adjust the delay amount in the data delay circuits;
   a reference optical pulse generation circuit which generates a reference optical pulse based on a test signal generated by the test signal generation circuit;
   an optical phase comparator, into which the monitor light selected by the optical switch and the reference optical pulse generated by the reference optical pulse generation circuit, detects an relative optical phase difference by comparing the monitor light and the relative optical pulses; and
   a control circuit, before an operation of the optical packet signal transmission device starts, which sequentially sends the test signals, generated by the test signal generation circuit instead of the data signals, to the data delay circuits, switches the monitor light selected by the optical switch corresponding to the data delay circuit as an adjustment object to which the test signal is sends, detects the monitor light selected by the optical switch and a relative optical phase of the reference optical pulse, determines the delay amount in the optical phase difference is smaller than a maximum limit value determined in advance based on a detection result, and sets the delay amount after the operation starts in the data delay circuit as the adjustment object.

2. The optical packet signal transmission device according to claim 1, wherein the data delay circuit includes:
   a first selector, into which the data signal and the test signal are input, selects one of the input signals;
   a plurality of delay buffers having various delay amounts and delays the signals output from the first selector according to the delay amounts; and
   a second selector, into which the signals output from the first selector and the signals passing through the delay buffers are input, selects one of the input signals, wherein
   the control circuit, before the operation of the optical packet signal transmission device starts, in which the first selector of the data delay circuit selects the test signal and in which the delay amount in the data delay circuit gradually varies by switching the signal selected by the second selector.

3. The optical packet signal transmission device according to claim 1, wherein the transmitting unit includes:
   a light reception unit which converts an optical signal received from the client side into an electric signal;
   a packet decomposing circuit which outputs the plurality of data signals generated by decomposing the continuous data included in the electric signal output from the light reception unit and which generates a label signal indicating a piece of destination information related to the plurality of data signals and a piece of node switching information;
   an optical label emission unit which has a wavelength that is different from the wavelength of the light emission unit and which generates an optical label by converting the label signal generated by the packet decomposing circuit into a light; and
   an optical packet multiplexing device which generates a WDM optical packet signal with an optical label by wavelength-multiplexing the optical packet signals with the wavelengths output from the light emission unit and the optical label output from the optical label emission unit.

4. The optical packet signal transmission device according to claim 1, wherein the control circuit determines the delay amount in which the optical phase difference detected by the optical phase comparator becomes smallest and sets the delay amount after the operation of the data delay circuit as the adjustment object starts.

5. The optical packet signal transmission device according to claim 1, further comprising:
   a receiving unit which converts the WDM optical packet signal received from the network side into the optical packet signal which is to be transmitted to the client side.

6. The optical packet signal transmission device according to claim 5, wherein the receiving unit includes:
   an optical separating device which separates the received WDM packet signals according to the wavelengths;
   a plurality of light reception units which converts the optical packet signals with the wavelengths separated by the optical packet separating device into electric data signals;
   a packet assembling circuit which generates a client signal by serializing the data signal output from the light reception unit; and
   the light emission unit which generates the optical packet signal by converting the client signal output from the packet assembling circuit into a light and which transmits the optical packet signal to the client side.

7. A WDM optical communication network comprising:
   a plurality of optical packet signal transmission devices, wherein each of the plurality of optical packet signal transmission devices includes:
   a transmitting unit which sends a plurality of data signals, obtained by decomposing continuous data included in an optical packet signal received from a client side, to a plurality of light emission units with various wavelengths, converts the plurality of data signals into optical packet signals, and transmits WDM optical packet signals generated by wavelength-multiplexed with the converted optical packet signals with wavelengths to a network side, wherein the transmitting unit includes:

a plurality of data delay circuits which has variable delay amounts and separately delays the data signals sent to the light emission units;

a plurality of optical branch units which branches some of the optical packet signals with the wavelengths, which are output from the light emission units, as monitor lights;

an optical switch which selects one of the monitor lights with the wavelengths to be branched by the optical branch units;

a test signal generation circuit which generates a test signal which is used to adjust the delay amount in the data delay circuits;

a reference optical pulse generation circuit which generates a reference optical pulse based on a test signal generated by the test signal generation circuit;

an optical phase comparator, into which the monitor light selected by the optical switch and the reference optical pulse generated by the reference optical pulse generation circuit, detects an relative optical phase difference by comparing the phases of the monitor light and the relative optical pulses; and a control circuit, before an operation of the optical packet signal transmission device starts, which sequentially sends the test signals, generated by the test signal generation circuit instead of the data signals, to the data delay circuits, switches the monitor light selected by the optical switch corresponding to the data delay circuit as an adjustment object to which the test signal is sends, detects the monitor light selected by the optical switch and a relative optical phase of the reference optical pulse, determines the delay amount in the optical phase difference is smaller than a maximum limit value determined in advance based on a detection result, and sets the delay amount after the operation starts in the data delay circuit as the adjustment object.

8. The WDM optical communication network according to claim 7, wherein the data delay circuit includes:

a first selector, into which the data signal and the test signal are input, selects and outputs one of the input signals;

a plurality of delay buffers having various delay amounts and delays the signals output from the first selector according to the delay amounts;

a second selector, into which the signals output from the first selector and the signals passing through the delay buffers are input, selects and outputs one of the input signals, wherein the control circuit, before the operation of the optical packet signal transmission device starts, in which the first selector of the data delay circuit selects the test signal and in which the delay amount in the data delay circuit gradually varies by switching the signal selected by the second selector.

9. The WDM optical communication network according to claim 7, wherein the transmitting unit includes:

a light reception unit which converts an optical signal received from the client side into an electric signal;

a packet decomposing circuit which outputs the plurality of data signals generated by decomposing the continuous data included in the electric signal output from the light reception unit and which generates a label signal indicating a piece of destination information related to the plurality of data signals and a piece of node switching information;

an optical label emission unit which has a wavelength that is different from the wavelength of the light emission unit and which generates an optical label by converting the label signal generated by the packet decomposing circuit into a light; and an optical packet multiplexing device which generates a WDM optical packet signal with an optical label by wavelength-multiplexing the optical packet signals with the wavelengths output from the light emission unit and the optical label output from the optical label emission unit.

10. The WDM optical communication network according to claim 7, wherein the control circuit determines the delay amount in which the optical phase difference detected by the optical phase comparator becomes smallest and sets, according to the determination result, the delay amount after the operation of the data delay circuit starts as the adjustment object.

11. The WDM optical communication network according to claim 7, further comprising:

a receiving unit which converts the WDM optical packet signal received from the network side into an optical packet signal to be transmitted to the client side.

12. The WDM optical communication network according to claim 11, wherein the receiving unit comprising:

an optical packet separator which separates the received WDM optical packet signals according to the wavelengths, a plurality of light reception units which converts the optical packet signals with the wavelengths separated by the optical packet separator into electric data signals, respectively;

a packet assembling circuit which serializes the data signal output from the light reception unit and generates a client signal; and a light emission unit which generates an optical packet signal by converting the client signal output from the packet assembling circuit into a light and then transmits the optical packet signal to the client side.

\* \* \* \* \*

UNITED STATES PATENT AND TRADEMARK OFFICE
CERTIFICATE OF CORRECTION

| | | |
|---|---|---|
| PATENT NO. | : 8,712,253 B2 | Page 1 of 1 |
| APPLICATION NO. | : 13/468494 | |
| DATED | : April 29, 2014 | |
| INVENTOR(S) | : Maeda et al. | |

It is certified that error appears in the above-identified patent and that said Letters Patent is hereby corrected as shown below:

On the Title Page Item [75], delete "Orojo" and insert -- Onojo --, therefor.

Signed and Sealed this
Twenty-ninth Day of July, 2014

Michelle K. Lee
*Deputy Director of the United States Patent and Trademark Office*